Oct. 23, 1934.  G. A. STACEY  1,978,148
MOTOR MOUNTING
Filed July 25, 1933
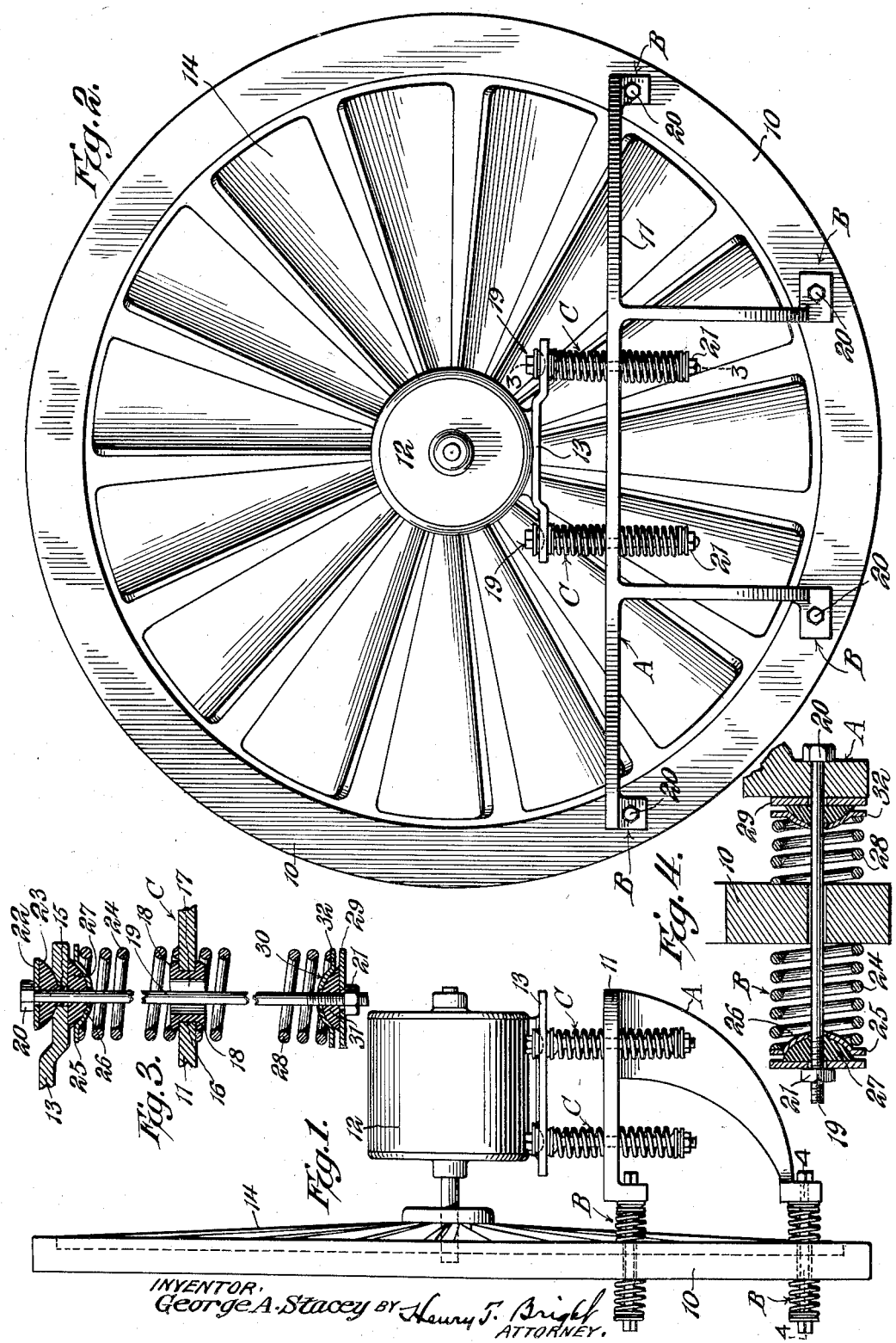
INVENTOR
George A. Stacey BY Henry T. Bright
ATTORNEY.

Patented Oct. 23, 1934

1,978,148

UNITED STATES PATENT OFFICE 1,978,148

MOTOR MOUNTING

George A. Stacey, Phoebus, Va., assignor of one-half to Charles C. Curtis, Hampton, Va.

Application July 25, 1933, Serial No. 682,162

4 Claims. (Cl. 248—16)

My invention relates to motor mountings and particularly to that type wherein the motor is yieldingly supported with a view of reducing or entirely eliminating noises ordinarily produced by the operation of the motor. My invention is particularly adapted for use in connection with fan motors employed in air conditioning apparatus of the general type disclosed in my co-pending application 622,511, filed July 14, 1932, but it will be understood that my mounting is in no way limited to such specific use.

My invention contemplates a novel construction for yieldingly supporting a motor and at the same time isolate the same from any metallic connection with its supporting elements through the interposition of yielding and sound-insulating material and thus eliminate the transmission of vibrations produced thereby to the motor supporting elements.

I will describe my invention as applied to an air conditioning apparatus fan motor mounting, but it will be apparent that the same is susceptible to changes in form and proportion and to desirable additions with the exercise of only ordinary mechanical skill.

In the drawing chosen to illustrate my invention, the scope whereof is set forth in the appended claims Figure 1 is a side elevation showing my improved mounting associated with a fixed fan ring, a fan motor being supported by the mounting;

Figure 2, a front elevation of what is shown in Figure 1;

Figure 3, a section on the line 3—3 of Figure 2; and

Figure 4, a section on the line 4—4 of Figure 1.

In the drawing 10 indicates a fan ring which, in actual use, would be incorporated in the air conduit of an air conditioning apparatus of the type shown in my application 622,511. When thus incorporated the ring 10 would constitute a fixed vertical element. Supported from the ring 10 is a bracket A as shown in Figure 1. The connection between the bracket and ring is constituted by four yielding and sound-insulating devices B. The bracket A including a horizontal shelf 11 upon which is directly supported a motor 12 having a base 13, said motor having fixed on its shaft a fan 14 which rotates in the ring 10. The connection between the motor base 13 and shelf 11 is constituted by four yielding and sound-insulating devices C. As the devices C are duplicates of one another only one will be described in detail. By reference to Figure 3 it will be noted that the base 13 and shelf 11 are provided with alined openings 15 and 16 respectively, the latter of which is lined with a rubber sleeve 17 having flanged ends 18 overlying the upper and lower faces respectively of the shelf 11 and serving to thereby secure the sleeve 17 against displacement from the opening 16. Engaged through the openings 15 and 16 is a bolt 19 of less diameter than either of said openings so that the bolt is capable of a certain desired amount of lateral displacement in all directions when such displacement is essential to the most effective operation of my mounting. In the event such displacement is great the sleeve 17 will prevent contact of the bolt with the shelf 11 and the transmission of vibrations through said shelf. The bolt 19 has enlargements at each end formed respectively by a head 20 and a nut 21. Engaged on the bolt 19 against the head 20 is a flat washer 22 and between this washer and the base 13 a rubber ring 23 is interposed, said ring having a flat face in engagement with the washer 22 and a convex face directed toward and engaging with the adjacent face of the base 13. Interposed between the base 13 and shelf 11 and surrounding the bolt 19 is a coil spring 24 one end of which seats against the shelf 11 about the adjacent flange 18 of sleeve 17 so that said flange operates to hold the spring in proper relation to the bolt 19. The end of the spring 24 remote from the shelf 11 seats against the marginal flange 25 of a cupped washer 26. The dished side of the washer 26 faces the base 13 and interposed between this washer and the base 13 and the washer 26 is a rubber ring 27 having a flat face in engagement with the base and a convex face engaged in the dish of the washer 26. Surrounding the bolt 19 between the nut 21 and shelf 11 is a coil spring 28 whose inner end seats against the bottom face of the shelf and surrounds the adjacent flange 18 of the sleeve 17 whereby said flange serves to hold the spring in proper relation to the bolt. A flat washer 29 is engaged on the bolt against the nut 21. Also engaged on the bolt 19 is a cupped washer 30 whose dished face is adjacent the washer 29. Between the washers 29 and 30 is a rubber ring 31 having a flat face engaged against the washer 29 and a convex face engaged in the dished portion of the washer 30. The outer end of the spring 28 bears against a marginal flange 32 included in the washer 30. It will be noted that the rings 23 and 27 are all constantly subjected to compression by the springs 24 and 28 with the result that they are partially forced into the opening 15 and effectively prevent contact of the bolt 19 with the metal base 13. The rings 27 and 31 also act, due to their convex formation, to prevent lateral shift of the washers 26 and 30 as will be apparent and thus function to maintain the outer ends of the springs 26 and 28 in proper relation to the bolt 19.

The device B is similar to the device C just described except that the washer 22 and ring 23 are omitted and as a result the head 20 of the bolt 19 directly engages the bracket A. In addition the bracket A and the ring 10 occupy the same status respectively in the device as the base 13 and shelf 11 in device C. The remaining parts of device B are indicated by the same reference characters as are applied to similar parts in device C in Figure 3.

I claim:

1. In combination, a supporting bracket including a shelf, a motor including a base, and a plurality of devices yieldingly connecting the bracket and base, each of said devices comprising a bolt extending through openings in the base and shelf, each opening being of greater diameter than the diameter of its related bolt and each bolt having enlarged end portions formed respectively by a head and nut, springs encircling the bolt and having their inner ends respectively engaged with opposite faces of said shelf, a flat washer on the bolt between an enlarged end of the latter and said base, a ring of yielding sound-insulating material on the bolt having a convex face engaging said base and a flat face engaging said washer, a cupped washer on the bolt engaged by the outer end of the adjacent spring and having its dished side adjacent the base, a ring of yielding sound-insulating material on the bolt having a convex side engaged in the dished portion of the cupped washer and a flat side adjacent said base, a flat washer on the bolt engaging the other enlarged end thereof, a cupped washer on the bolt engaged by the outer end of the adjacent spring, and a ring of yielding sound-insulating material on the bolt between said last named washers, said ring having a convex side engaged in the dished portion of the cupped washer and a flat side engaging said flat washer.

2. In combination, a fixed vertical element, a bracket including a horizontal shelf, a plurality of devices connecting the bracket to the fixed element, each of said devices being yielding and sound-insulating and constituting the sole means of supporting the bracket from the fixed vertical element, a motor including a base, and a plurality of devices connecting the base and shelf, each of said devices being yielding and sound-insulating.

3. In combination, a fixed vertical element, a bracket at one side of the element, said bracket including a horizontal shelf, a plurality of devices connecting the bracket to the fixed element, each of said devices being yielding and sound-insulating and constituting the sole means of supporting the bracket from the fixed vertical element, a motor including a base, and a plurality of devices connecting the base and shelf, each of said devices being yielding and sound-insulating.

4. In combination, a fixed vertical element, a bracket at one side of the element, said bracket including a horizontal shelf, a plurality of devices connecting the bracket to the fixed element, each of said devices being yielding and sound-insulating and constituting the sole means of supporting the bracket from the fixed vertical element, a motor including a base, and a plurality of devices connecting the base and shelf, said devices having their axes disposed at an angle to the axes of the devices connecting the bracket and fixed element and each of them being yielding and sound-insulating.

GEORGE A. STACEY.